Jan. 21, 1947.　　　　　L. PIERCE　　　　2,414,554
ELECTRIC CONTACTOR
Filed Dec. 11, 1943　　　5 Sheets-Sheet 3

WITNESSES:

INVENTOR
Lawrence Pierce.
BY
ATTORNEY

Jan. 21, 1947.    L. PIERCE    2,414,554
ELECTRIC CONTACTOR
Filed Dec. 11, 1943    5 Sheets-Sheet 4

WITNESSES:
C. J. Weller.
Curt M. Avery

INVENTOR
Lawrence Pierce.
BY
Paul E. Friedemann
ATTORNEY

Jan. 21, 1947.                L. PIERCE                 2,414,554
                          ELECTRIC CONTACTOR
                       Filed Dec. 11, 1943           5 Sheets-Sheet 5

WITNESSES:                                         INVENTOR
                                                 Lawrence Pierce.
                                                       BY
                                                          ATTORNEY Patented Jan. 21, 1947

2,414,554

UNITED STATES PATENT OFFICE 2,414,554

ELECTRIC CONTACTOR

Lawrence Pierce, Edgewood, Pa., assignor to Westinghouse Electric Corporation, East Pittsburgh, Pa., a corporation of Pennsylvania Application December 11, 1943, Serial No. 513,974

22 Claims. (Cl. 200—122)

My invention relates to thermostatically controlled electric apparatus and, in one of its specific aspects, to manually operable motor starters containing an overload responsive tripping device.

It is an object of the invention to provide such apparatus with thermostatic overload-responsive tripping means of improved design and operation. More particularly, the invention aims at rendering the operation of the tripping means insensitive to changes in ambient temperature and permitting an accurate adjustment of the tripping conditions within wide limits of selective load values. In conjunction therewith, the invention is intended to afford these advantages by a construction which can be readily applied in multi-phase apparatus so that an overload or other tripping condition occurring in any one phase will cause a tripping operation. An object, related to the same aim, is to simplify the means required for ambient temperature compensation so that a single compensating device suffices for any number of circuit phases.

Another object of my invention, particularly in combination with the foregoing, is to render the different phase-sections or overload-responsive tripping units of a multiphase contactor separable from one another and exchangeable for units of different rating so as to afford an increased range of adaptability and adjustability of the apparatus to circuits of different numbers of phases or different load capacities or the like conditions.

A still further object, in conjunction with any of the foregoing, is to devise a contactor of the type mentioned, whose load-responsive tripping device is protected from uncontrolled operation when exposed to high impact forces or vibrations; and it is also intended to achieve this protection without the use of additional shock-responsive latching devices or the like supplemental means extraneous to the contact and tripping mechanisms proper.

It is known to provide electric contactors, such as motor starters, with a toggle joint mechanism for the manual closing and opening of a circuit and to arrange the normally stationary abutment or pivot point of the toggle joint on an angularly displaceable cradle which, controlled by an overload responsive release mechanism, will change its position and thus trip the toggle joint for automatic interruption of the circuit upon occurrence of a given overload condition. Referring to this type of switch, it is also an object of my invention to provide an overload-responsive device for controlling the cradle of a releasable toggle joint mechanism in accordance with one or several of the objects stated in the foregoing and, particularly, to render the automatic operation of such a toggle joint switch insensitive to changes in ambient temperature as well as to high impact shocks. Considering the fact that it is usually infeasible or impracticable to balance the cradle of such a contactor about its pivot axis, one aspect of my invention aims at affording, nevertheless, a safe protection from uncontrolled cradle motion under shock without introducing any appreciable complication and without the use of additional shock protective equipment.

These and other objects and advantages of my invention will become apparent from the following description of the embodiment illustrated in the accompanying drawings.

Fig. 10 is a separate illustration of several normally stationary parts of the mechanism according to Figs. 8 and 9, while Fig. 11 represents an axial section through a quill or sleeve member forming part of the same mechanism; while

Figure 1:
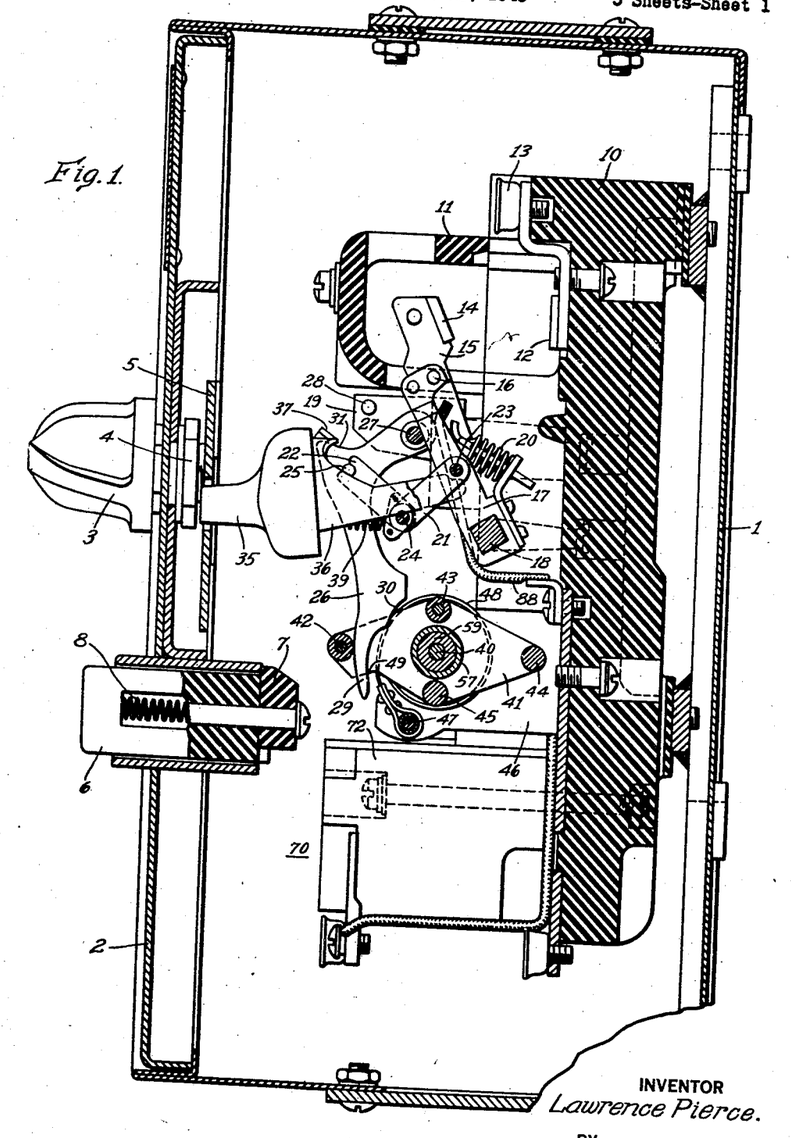
Figure 1 is a part sectional side view of a manual motor starter designed in accordance with my invention.

Referring to the drawings, the watertight and drip-proof casing 1 of the motor starter (Figs. 1 and 2) has a removable cover 2 which carries a rotatable operating knob 3. A crank 4 is attached to the knob and engages a slider 5 (Fig. 1).

When turning the knob 3, the slider 5 is moved in the upward or downward direction, thereby actuating the operating handle 35 of a switch mechanism. The cover 2 is further provided with an emergency button 6 which carries a cam member 7 and is biased by a spring 8 so as to normally project out of the cover. This emergency button permits operating the manually actuated switch mechanism during the persistence of overload-responsive tripping conditions as will be explained in a later place.

Figure 2:
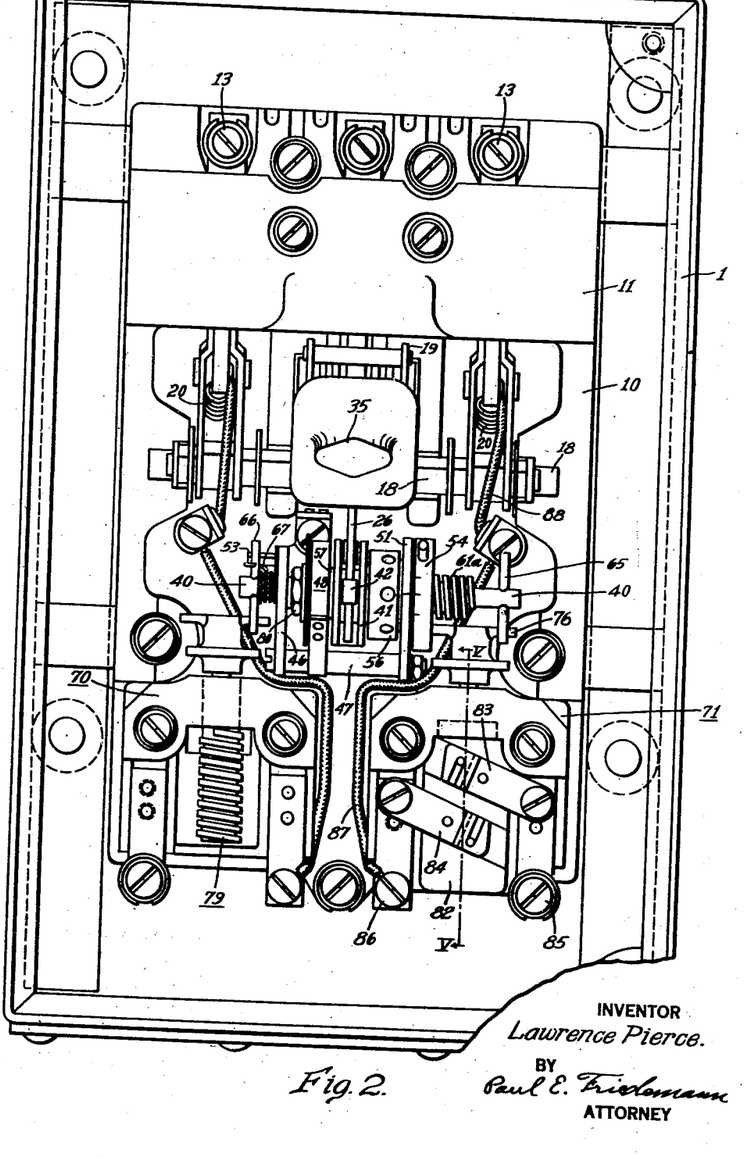
Fig. 2 represents a front view of the motor starter with the cover of its casing removed.

The contact and actuating elements of the starting switch proper are mounted on an insulating support or base 10 which, in turn, is fastened to the bottom of the casing 1. An insulating structure 11 forming a group of arcing chambers is rigidly mounted on the base 10 (Figs. 1 and 2). The illustrated starter is designed for three-phase operation. Hence, three pairs of contacts are provided in three separate arcing chambers formed by the insulating body 11. Each of the pairs of contacts is designed in accordance with the following description of the single pair apparent in Fig. 1.

A stationary contact 12 is secured to the base 10 within one of the arcing chambers of body 11, and is provided with a terminal 13 for connecting one of the circuit phases thereto. A movable contact 14, also located within the arcing chamber, is fixed to a contact carrier 15, which, at 16, is pivoted to a contact arm 17. The contact arm is firmly attached to a shaft 18 which, in turn, is pivoted on a frame structure 19 firmly attached to the base 10. A helical compression spring 20, acting between the contact arm 17 and the contact carrier 15, tends to rotate the carrier clockwise about its pivot 16 so as to hold it against an abutment of arm 17. As a result, the contact 14 and its carrier 15 assume the position illustrated in Fig. 1 relative to the contact arm 17 when the switch is in the contact-interrupting position. However, when the contact arm, by the mechanism to be described presently, is moved towards the contact closing position and engages the stationary contact 12, the contact 14 and its carrier 15 are capable of yielding in the counterclockwise direction against the force of the contact spring 20 so that the latter serves to exert the necessary contact pressure between the closed contacts 12 and 14.

The mechanism for actuating the contact arm 17 contains two links 21 and 22 which form a toggle joint. Link 21 is pivoted at 23 to the contact arm 17 and at 24 to the link 22. The other end of link 22 abuts against a pivot pin 25 mounted on a cradle 26. The cradle is fulcrumed by shaft 27 to the stationary frame 19 which also carries a stop pin 28 for limiting the angular motion of the cradle 26 in the clockwise direction.

The cradle 26 has an end portion 29 (Figs. 1, 3 and 4) which in the inoperative position of the overload-responsive tripping mechanism, is engaged by a roller 42 mounted on a rotatable roller carriage 41 of a catch member. As long as this member is in the position shown in Figs. 1 and 4, the cradle 26 is prevented from rotating in the clockwise direction. The back portion of the cradle forms a cam surface 30 which serves to engage a roller 43 of the carriage 41 when resetting the mechanism after the occurrence of a tripping operation as will be set forth hereinafter. Another cam surface is provided at 31 also for operation during the resetting of the switch.

The above-mentioned handle 35 for actuating the switch is mounted on a member 36 which straddles the cradle 26 and the above-described toggle joint. The lower ends of member 36 extend towards the pivot pin 23 of the toggle link 21 and engage the pin for pivotal motion when the handle is tilted between its "on" and "off" positions. The member 36 forms an abutment 37 for engagement with the back portion of the cradle 26. A toggle spring 39 (Figs. 1 and 3) is connected between the handle 35 and the pivot pin 24 of the toggle joint and has the tendency to pull the pin 24 towards the handle.

The roller carriage 41 of the catch member is rigidly mounted on a sleeve 57 which is rotatable about a shaft 40. As apparent from Fig. 1, two pins 44 and 45 are mounted on the carriage 41, the pin 44 being symmetrical to roller 42 and the pin 45 symmetrical to roller 43 with respect to the axis of rotation. The roller carriage thus is diamond-shaped with the exception of a stop surface formed at 49. This surface serves to engage a stationary pin 47 for limiting the rotation of the motion of the roller carriage in the tripping direction. A return spring 48 has one end attached to the stationary pin 47 while its other end is connected with the sleeve 57. This spring biases the roller carriage 41 and moves in the tripping direction. However, such motion is normally prevented by an overload-responsive clutch mechanism which will be described in a later place. Due to the action of this clutch mechanism, the roller carriage 41, under the normal operating conditions, maintains the position shown in Figs. 1 and 2. The toggle spring 39 acting on toggle pin 24 has the tendency to move the link 22 towards the handle 35 thereby imposing a rotational bias on the cradle 26 in the clockwise direction. However, as long as the roller 42 engages the cam surface of cradle portion 29, a rotation of the cradle is prevented.

As far as described in the foregoing, the motor starter operates as follows.

Due to the engagement of handle 35 with a slot in the slider plate 5 of the cover structure, a manual rotation of knob 3 has the effect of tilting the handle 35 between its "on" and "off" positions. Fig. 1 shows the position in which the circuit between contacts 12 and 14 is interrupted. When rotating the knob 3 so as to tilt the handle 35 upwardly, the toggle spring 39 is stressed while its point of attachment to the handle 35 moves in the direction of the toggle joint pivot pin 25. This pin is at first kept stationary because the cradle 26, though also biased by the toggle spring, is latched in position. As the motion of the handle 35 progresses, the center line of the toggle spring 39 will pass beyond the abutment pin 25, and hence through the dead-center position of the toggle point so that the pivot pin 24 is forced upwardly to a position above pins 23 and 25. As a result, the links 21 and 22 exert a pushing force on the contact arm 17 thereby rotating the arm in the clockwise direction until the movable contact 14 engages the stationary contact 12, and the necessary contact pressure is established by the action of contact spring 20.

When returning the handle 35 from the just-mentioned "on" position to the "off" position by reversing the rotation of knob 3, the toggle spring 39 will again pass through a dead-center position until its force imposes a component on the pivot pin 24 in the downward direction so that the links 21 and 22 of the toggle joint are caused to snap into their original, illustrated position with the effect of rotating the contact arm 17 and the stationary contact 14 into the interrupting position.

It has been pointed out that upon occurrence of an overload the roller carriage 41 is caused to rotate counterclockwise until its stop surface 49 engages the stationary pin 47 (Fig. 1). Hence when an overload occurs, the roller 42 will move out of engagement with the cam end 29 of the cradle 26 into the position illustrated in Fig. 3. As a result, the cradle 26 is now released to follow the rotational bias of the toggle spring 39. The cradle snaps into the position shown in full lines in Fig. 3, the motion being limited by the stop pin 28. This rotation of the cradle displaces the abutment pin 25 of the toggle joint. Assuming that the switch mechanism was in circuit closing position when the overload-responsive release motion occurred, this displacement has the effect of shifting the links of the toggle joint beyond the dead-center position so that the toggle spring 38 is free to move the pivot pin 24 and hence the link 21 and the contact arm 17 into the contact interrupting position shown in Fig. 3.

Figure 3:
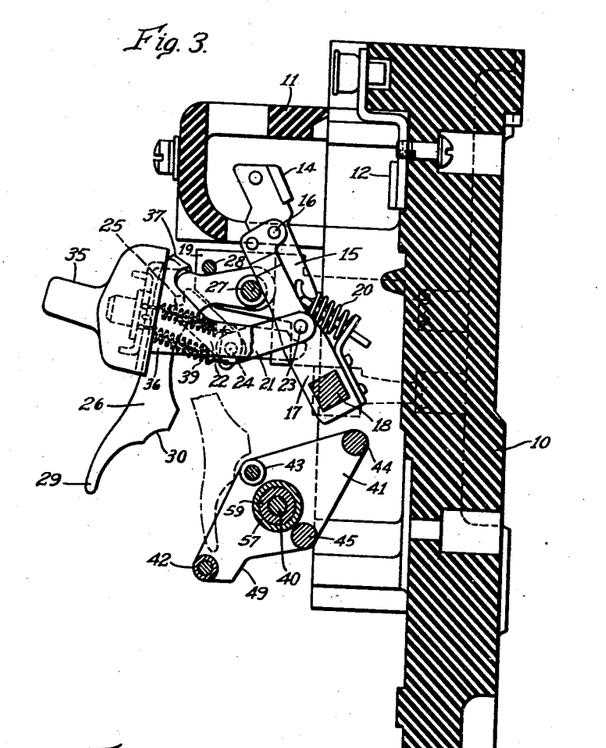
Fig. 3 shows a partial and part sectional side elevation similar to Fig. 1 representing the switch mechanism in tripped position.

In order to reset the starter, the handle 35 is moved from the position shown in Fig. 3 towards the "off" position. During this motion, the cam surface 31 of the cradle 26 is engaged by the stop 37 of the handle, thereby rotating the cradle 26 counterclockwise into the position represented in Fig. 3 by broken lines. The cam portion 30 of the cradle 26 will now abut against the roller 43 of the carriage 41. Hence, during the latter part of the handle motion, the roller 43 is forced to rotate the carriage 41 clockwise in the resetting direction. If, in the meantime, the thermostatic elements of the tripping mechanism have sufficiently cooled to permit latching of the carriage 41 in the original position, the cradle 26 at the end of the just-mentioned resetting operation is again latched in the position illustrated in Fig. 1. The switch contacts can now be closed by returning the handle 35 to the "on" position.

When it is desired to close the switch contacts immediately after the occurrence of an overload, i. e. before the thermostatic elements of the tripping mechanism have sufficient time to cool, or in cases where the motor controlled by the starter has to be operated in spite of the persistence of an overload, the emergency button 6 (Fig. 1) is depressed by the operator. The cam portion 7 of this button then engages the tripping end of the cradle 26 and forces it down into the operative position regardless of the condition of the tripping mechanism. The switch contacts can then be closed manually as long as the emergency button is kept depressed. When the overload persists, the release of the emergency button will immediately cause the cradle to move into tripping position thus opening the motor circuit.

Figure 4:
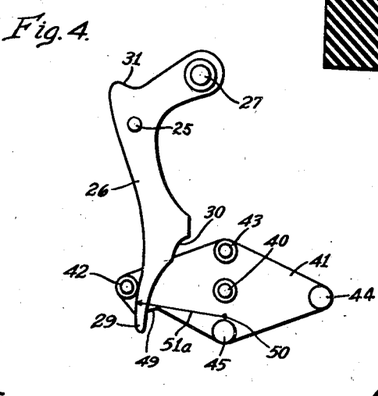
Fig. 4 shows details of the overload-responsive tripping device of the same contactor.

While the illustrative motor starter is comparable to known contactors of this type as regards the basic manual and automatic operations just mentioned, it affords a number of improvements and advantages. Due to the above-described design of the catch member, the rotary part of the tripping mechanism is substantially balanced about its axis of rotation in static and dynamic respects. Consequently, when high impact forces or vibrations are transmitted to the base of the apparatus and thence to the bearings and shafts of the mechanism mounted thereon, such forces will be virtually ineffective on the operation of the tripping device. In particular, the catch member or roller carriage 41 does not have the tendency to perform a tripping motion when under the influence of such shock forces. The cradle 26 cannot be easily balanced about its stationary pivot axis and hence may be caused to vibrate upon the occurrence of shock. However, the illustrated contactor, in accordance with my invention, is so designed that such vibrations do not have the tendency to cause uncontrolled tripping. Referring to Fig. 4, it will be seen that the curvature of the cam portion 29 of the cradle 26 is so chosen at the point of engagement with the roller 42, that the force exerted by the cradle 26 on the roller 42, especially when the contactor is exposed to high impact forces, tends to move the roller 42 away from the tripping end of the cradle. That is, at the place of engagement between the roller 42 and the cam portion 29 of the cradle, the cam curve is inclined towards the pivot axis of the cradle. A simple way of realizing such a design is to shape the cam surface of the cradle portion 29 as a circle whose center is located at the side of the axis of rotation of carrier 41 away from the pivot shaft 27 of the cradle. In Fig. 4, the center of the just-mentioned circular cam curve is denoted by 50 and the appertaining radius by an arrow marked 51a. By virtue of this balanced design of the catch member and the just-mentioned construction of its engagement with the cradle of the toggle joint mechanism, a contact apparatus according to the invention can be used to advantage in places where heavy shocks or vibrations are to be expected, such as on board of war vessels.

The above-mentioned tripping motion of the roller carriage 41, in response to the occurrence of overload, is obtained by means which will now be described in detail.

Figure 8:
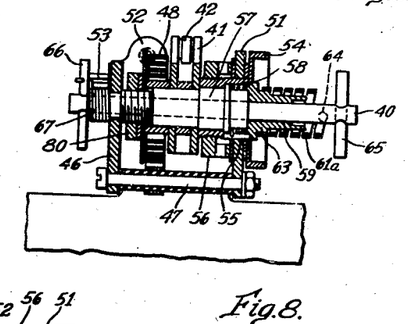
Fig. 8 is an axial section through the overload-releasable catch member with the appertaining mechanism of the same apparatus.
Figure 9:
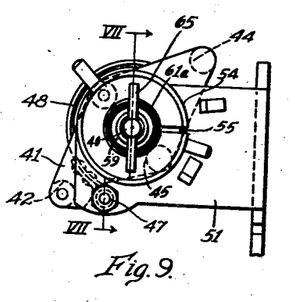
Fig. 9 is a side elevation of the same mechanism.
Figure 10:
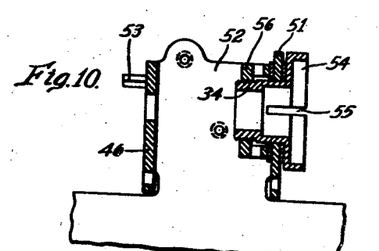

The roller carriage 41 is rigidly mounted on the sleeve 57 by means of a clamping nut 80 (Fig. 8). As stated previously, the return spring 48 of the tripping mechanism has one end attached to the sleeve 57 and the other to the stationary pin 47. This pin 47 is fastened between two plates 46 and 51 formed by a substantially U-shaped frame 52 which is firmly mounted on the base 10 (Figs. 1, 8, 9, 10 and 12). The sleeve 57 is revolvably mounted on a shaft 40 and journalled in a stationary bushing 34 which forms part of a drum shaped adjusting member 54 (Fig. 10). The drum member is slotted at 55 and is fastened to the plate 51 by means of a nut 56 (Figs. 8 and 10). Normally, the angular position of the adjusting member 54 and hence of its slot 55 relative to the stationary frame structure is fixed. However, the nut 56 permits changing this position in order to permit calibrating or adjusting the tripping characteristic of the device as will become apparent hereinafter. Figs. 8 and 10 show the slot 55 in two different angular positions.

A helical clutch spring 58 is arranged in an annular interstice between the adjusting member 54 and the sleeve 57. One end 68 of the clutch spring is fixed, while the other end 69 is normally free (Fig. 12). A quill 59 (Figs. 8, 11 and 12) has two lugs 60 and 61 peripherally spaced from each other so as to straddle the spring end. The spring 58 is so dimensioned that it engages the peripheral surface of the sleeve 57 with a tight frictional grip. As a result, any rotation of the sleeve and the roller carriage in the tightening direction of the clutch spring has the effect of increasing the frictional grip of the spring on the sleeve. Hence, a rotation of the spring in this direction is normally prevented while a rotation of the roller carriage 41 and sleeve 57 in the opposite direction is virtually not impeded. The spring 58 thus acts as a unidirectionally effective clutch which prevents the return spring 48 from moving the roller carriage into the tripping direction. However, when the lug 60 of the quill 59 is rotated towards the end 69 of the clutch spring 58 (Fig. 12), this end will be entrained in the unwinding direction of the clutch spring. As a result, the grip of the spring on the sleeve 57 is loosened so that now the return spring 48 is effective to turn the roller carriage in the tripping direction until its stop surface 49 abuts against the stationary pin 47.

While in the schematic showing of Fig. 12 the end 68 of the clutch spring 58, in the interest of a simplified illustration in this explanatory figure, is shown to engage the stationary frame structure directly, this spring end, in the actual construction, is held in place by engaging the slot 55 of the adjusting member 54 (Figs. 8 and 10).

Figure 11:
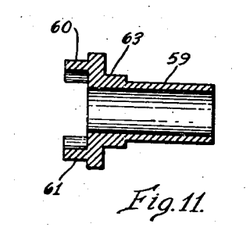
Figure 12:
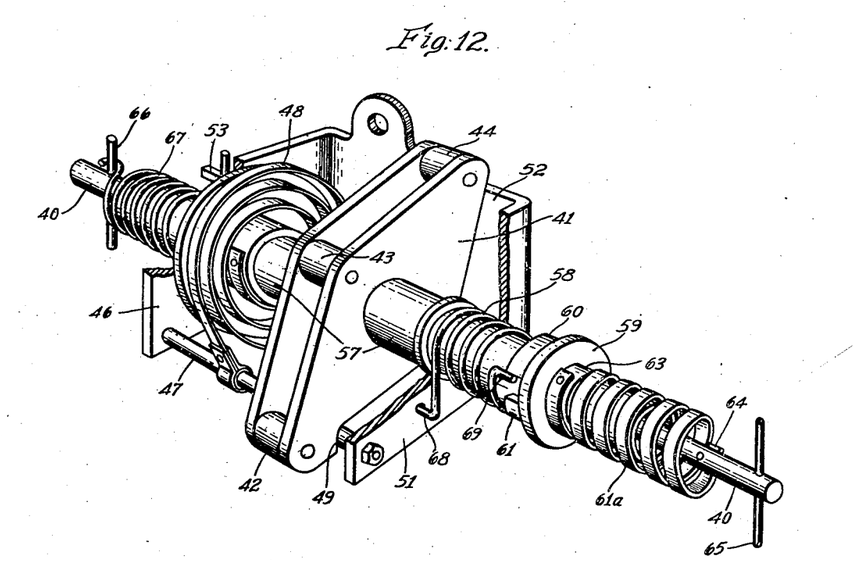
Fig. 12 is a schematic and somewhat exploded view, in perspective, of the mechanism represented in Figs. 8 through 11.

A helical bimetal winding 61a has one end fastened to the base portion 63 of the quill 59 (Figs. 11 and 12). The other end of winding 61a is fastened at 64 to the shaft 40. As apparent from Fig. 2, the bimetal winding 61a is not provided with electric heating means but is merely exposed to the ambient temperature. Consequently, it deflects angularly in accordance with changes in this temperature. Thus the angular position of the shaft 40 relative to the quill 59 and the releasing lug 60 is varied in dependence upon ambient temperature changes.

Two cross pins 65 and 66, respectively, are fastened to the shaft 40. A return spring 67, abutting with one end against the pin 66 and with the other against a stationary stop 53, exerts a slight rotational bias on the shaft 40 tending to turn it in opposition to the tripping motion to be imparted to the shaft 40 by overload-responsive actuating units to be described presently.

Two such overload-responsive units are provided which, in Fig. 2, are denoted as a whole by numerals 70 and 71, respectively. The units are of similar design so that only one need be specifically described.

Figure 5:
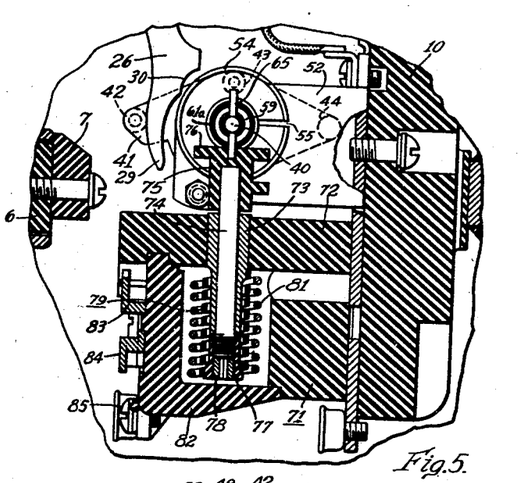
Fig. 5 is a sectional view of one of the overload-responsive release units of the motor starter, the section being taken along the plane denoted in Fig. 2 by the dot and dash line marked V—V.
Figure 6:
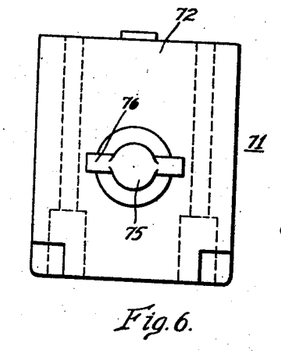
Fig. 6 is a top view of the release unit according to Fig. 5.
Figure 7:
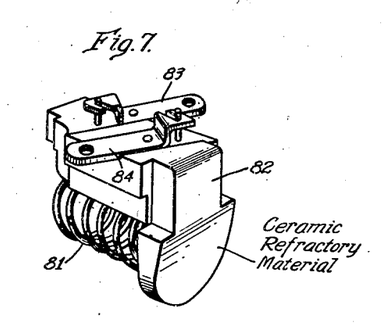
Fig. 7 illustrates, in perspective, an exchangeable heater forming part of the unit shown in Figs. 5 and 6.

The unit 71 has an insulating body 72 which forms a cavity covered by an insulating body 82 of generally angular shape (Figs. 5, 6 and 7). The insulating bodies 72 and 82 consist preferably of refractory material. A bushing 73 is firmly inserted in the body 72 and serves as a stationary journal for a pin 74, which carries an insulating head 75 provided with a cross bar 76. This cross bar extends at a right angle to the cross pin 65 of shaft 40 (Figs. 2 and 5). Hence when the shaft 74 is rotated in the proper direction, the bar 76 engages the pin 65 and imparts rotation thereto in the tripping direction of the shaft 40. A threaded collar 77 is firmly attached to the mechanism shaft 74 by means of a lock nut 78. A helical bimetal winding 79 has one end attached to the collar 77 while the other end is fastened to the bushing 73. A heating winding 81 surrounds the bimetal winding 79 concentrically and is mounted on the above-mentioned angular cover 82, as is best apparent from Fig. 7. The ends of the heater 81 are connected with terminals 83 and 84 which are also rigidly attached to the insulating body 82. The heater, its terminals and insulating body 82 thus form an integral part which can readily be detached from the actuating unit and thus permits exchanging it for heaters of different rating. The terminals 83 and 84, when in proper position, are in contact engagement with terminals 85 and 86, respectively, which are firmly mounted on the body 72 of the unit (Fig. 2). The terminal 86 is connected by cables 87 and 88 (Figs. 1 and 2) with the contact carrier 15 and thus with the movable contact 14 of the switch mechanism. In this manner, the overload-responsive control unit 71 is series connected with the contact pair in one phase of the circuit to be controlled, the circuit phase leads being attached to terminals 13 and 85. Similarly, the unit 70 is series-connected with the switch contacts in another phase of the circuit.

When an overload occurs in one of the circuit phases, for instance in that of the actuating unit 71, the heater 81 causes the bimetal winding 79 to rotate the shaft 74 (Fig. 5) thereby rotating the cross bar 76 towards the cross pin 65 of shaft 40 which is held in engagement with the cross bar by the biasing force of the return spring 67 (Fig. 8). The shaft 40 now revolves in the tripping direction. This motion is transmitted through the compensating bimetal 61a to the quill 59, so that the lug 60 moves toward the end 69 of the clutch spring 58 (Fig. 12). If the current load in heater 81 exceeds a rated tripping value and persists for a sufficient period, the lug 60 will abut against the end 69 and entrain it in the tripping direction, thereby loosening the clutch spring 58 so that the tripping spring 48 is released and rotates the roller carriage 41 in the tripping direction with the result of unlatching the cradle 26 of the toggle joint mechanism as described in the foregoing. After the interruption of the circuit by the switch contacts, the heater 81 cools and the bimetal 79 of unit 71 returns into its original condition thereby rotating the shaft 74 and the cross head 76 back to the original position. Due to the action of the return spring 67, the shaft 40 and the quill 59 with its lug 60, will also return and thereby reset the clutch spring 58. Consequently, when now the roller carriage 41 is moved against the force of the tripping spring 48 in the manner previously described, the clutch spring 58 will again be active to prevent the return motion of the carriage.

The bimetal windings of the overload-responsive units, such as winding 79 of unit 71 (Fig. 5), are, of course, also subject to the effect of ambient temperature. Hence when the ambient temperature rises, this has also the effect of turning the shafts 74 and 40 in the tripping direction. If the shaft 40 were rigidly connected with the releasing sleeve 59, such motion would reduce the distance between the lugs 60 and the end 69 of the clutch spring 58 (Fig. 12). Consequently, at an increased ambient temperature, a lower overload than the rated value would suffice to cause tripping of the switch. However, due to the fact that sleeve 59 is connected with shaft 40 by the compensating bimetal winding 61, such disturbing effects of changes in ambient temperature are eliminated. That is, the bimetal winding 61a is so wound that, when it varies the angular position of sleeve 59 relative to shaft 40 in accordance with changes in the ambient temperature, such variation occurs in opposition to the tripping direction. Consequently, a variation in ambient temperature tending to cause the bimetal 79 (Fig. 5) to move the lug 60 (Fig. 12) towards the end 69 of the clutch spring 58 will at the same time cause the compensating winding 61a (Fig. 12) to move the lug 60 away from the end 69. These two effects balance each other so that the tripping distance between parts 59 and 60 is virtually constant for a wide range of ambient temperatures.

The just-mentioned tripping distance can be varied at will by changing the angular position of the adjusting member 54 (Figs. 8 and 10). By turning this member, the slot 55 causes the end 68 of the clutch spring 58 to rotate accordingly thereby displacing the entire clutch spring and its tripping end 69 towards or away from the lug 60 (Fig. 12). An increase in trip distance thus obtained will require a correspondingly high load current for a tripping operation. This affords an easy and accurate setting of the device, for instance between 90% and 110% of the rated overload value. The peripheral drum surface of the adjusting member 54 can be calibrated in percent of the rated current value in order to facilitate the just-mentioned adjustment (see Fig. 2). If the heater of the actuating unit in any of the circuit phases fails to cause tripping at the intended overload value, a differently rated heater can be substituted by exchanging the part 82 (Fig. 7). For very large current intensities, the heating winding may consist of a single turn of correspondingly large cross section.

While it has been pointed out that the roller carriage 41 is statically and dynamically balanced with respect to its axis of rotation, it will now also be seen that the clutch means for latching the carriage as well as the release means for controlling the clutch action are also symmetrical to the axis of rotation and hence statically and dynamically balanced with respect to this axis. To this end, the above-mentioned lug 61 of quill 59 (Figs. 11 and 12) is provided, in order to balance the active lug 60. As a result, any shock force transmitted from the base 10 of the contactor to the movable parts of the tripping mechanism produce no momentum and hence are ineffective. The balanced and very low inertia of the helical spring 58 and the gripping effect of its turns on the peripheral surface of the sleeve 57 enable this clutching device to withstand extremely high rates of acceleration during shock without releasing its grip. Thus a very high clutching force is exerted and maintained during the persistence of shock forces. This contributes also to a reliable operation of the switch.

In conjunction with these advantages, the clutching device and the appertaining tripping means require a very small motion for performing their tripping operation. They also require extremely little space as compared with other clutching or latching devices for overload breakers of this type.

The above-described contactor lends itself readily to being modified for various purposes and circuit connections. For instance, while in the illustrated embodiment two actuating units are used each connected in a different phase of the circuit to be controlled, the same apparatus is also applicable for single-phase operation. In the latter case, one of the two actuating units 70 or 71 (Fig. 2) is removed from the apparatus so that the tripping shaft 40 is controlled only by the remaining unit. Such a single unit switch can be used for single-phase alternating current or direct current. On the other hand, a similar arrangement can be employed with more than two actuating units merely by extending the tripping shaft 40 and coupling it with one or more additional actuating units in a similar manner as described in the foregoing with reference to units 70 and 71. In these different cases of application, the apparatus according to the invention has the advantage that a single thermostat is employed for compensating ambient temperature changes regardless of the number of overload-responsive actuating devices.

In view of the above-mentioned modifications and since the possibility of other variations of my invention will be obvious to those skilled in the art, I wish this specification to be understood as illustrative and not in a limiting sense.

I claim as my invention:

1. A multiphase electric apparatus comprising, in combination, a movable member biased for motion in a given direction, means for latching said member against its bias, a rotatable part for releasing said latching means upon rotating a given angle, a rotatable transmission member, a compensating thermostat exposed to ambient temperature and connected between said part and said transmission member for rotating said part relative to said transmission member in accordance with changes in said temperature, and a plurality of electrically heatable thermostats for producing motion in response to the current in the respective phases of the apparatus, and means for individually coupling said latter thermostats with said transmission member for rotating it upon deflection of any one of said latter thermostats so that said part is rotated in accordance with the differential deflection between said one thermostat and said compensating thermostat.

2. A multiphase electric apparatus comprising, in combination, a movable member biased for motion in a given direction, means for latching said member against its bias, a revolvable part for releasing said latching means, a revolvable shaft extending coaxially to said part, a bimetal winding exposed to ambient temperature and having one end connected to said part and the other end to said shaft for varying their relative angular position in accordance with changes in said temperature, a plurality of electrically heated thermostats for deflection in response to the current in the respective phases of the apparatus, and transmission means individually connecting said latter thermostats with said shaft for revolving it in dependence upon deflection of any one of said latter thermostats so that said part is revolved in accordance with the differential deflection between said one thermostat and said compensating thermostat.

3. An electric overload responsive apparatus comprising, in combination, a movable member biased for motion in a given direction, means for latching said member against its bias, a revolvable part for releasing said latching means, a revolvable shaft coaxial with said part, a bimetal winding exposed to ambient temperature and having one end connected to said part and the other end to said shaft for varying their relative angular position in accordance with changes in said temperature, means for biasing said part, shaft and winding toward inoperative position of said part, and an electrically heated thermostat connected with said shaft for revolving it in opposition to said biasing means in response to electric overload.

4. An electric overload-responsive apparatus comprising, in combination, a rotatable member biased for rotation in a given direction, a clutch normally engaging said member for preventing its rotation in said direction, a revolvable part arranged coaxially to said member for releasing said clutch, a revolvable shaft coaxial with said member, a compensating bimetal winding connected between said part and shaft for varying their relative angular position in accordance with changes in ambient temperature, means for biasing said part, shaft and winding toward inoperative position of said part, a thermostat coupled with said shaft for revolving it in opposition to said biasing means when performing heat-responsive deflection, and means for heating said thermostat in accordance with an electric load.

5. An electric multiphase apparatus for overload protection, comprising in combination, a rotatable member biased for rotation in a given direction, a clutch normally engaging said member for preventing its rotation in said direction, a revolvable part arranged coaxially to said member for releasing said clutch, a revolvable shaft coaxial with said member, a compensating bimetal winding connected between said part and shaft for varying their relative angular position in accordance with changes in ambient temperature, a plurality of thermostats individually coupled with said shaft so that any one is capable of revolving said shaft by thermal deflection in opposition to said biasing means, said latter thermostats being each provided with heating means so as to respond to overload current in the respective phases of the apparatus.

6. An electric overload-responsive apparatus comprising, in combination, a rotatable member biased for rotation in a given direction, a helical clutching spring normally engaging said member for preventing its rotation in said direction, a rotatable part coaxial with said member for engaging said spring in order to loosen it from said member so as to release said member to rotate under its bias, a revolvable shaft coaxial with said member, a bimetal winding exposed to ambient temperature and having one end connected to said part and the other end to said shaft for varying their relative angular position in accordance with changes in said temperature, means for biasing said part, shaft and winding toward inoperative position of said part, an electrically heated thermostat connected with said shaft for revolving it in opposition to said biasing means in response to electric overload.

7. An electric overload-responsive apparatus comprising, in combination, a rotatable member biased for rotation in a given direction, a helical clutching spring normally engaging said member for preventing its rotation in said direction while permitting rotation in the opposite direction, a rotatable part coaxial with said member for engaging said spring in order to loosen it from said member so as to release said member to rotate under its bias, resetting means for rotating said member in said opposite direction, a revolvable shaft coaxial with said member, a bimetal winding exposed to ambient temperature and having one end connected to said part and the other end to said shaft for varying their relative angular position in accordance with changes in said temperature, means for biasing said part, shaft and winding toward inoperative position of said part, an electrically heated thermostat connected with said shaft for revolving it in opposition to said biasing means in response to electric overload.

8. An electric multiphase apparatus for overload protection, comprising, in combination, a rotatable operating member biased for rotation in a given direction, a helical clutching spring normally engaging said member peripherally for preventing its rotation in said direction while permitting rotation in the opposite direction, a rotatable part coaxial with said member for engaging said spring in order to loosen it from said member so as to release said member to rotate under its bias, resetting means for rotating said member in said opposite direction, a revolvable shaft coaxial with said member, a bimetal winding exposed to ambient temperature and having one end connected to said part and the other end to said shaft for varying the relative angular position in accordance with changes in said temperature, means for biasing said part, shaft and winding toward inoperative position of said part, a plurality of thermostats individually coupled with said shaft so that any one is capable of revolving said shaft by thermal deflection in opposition to said biasing means, said latter thermostats being each provided with heating means so as to respond to overload current in the respective phases of the apparatus.

9. An overload-responsive electric contactor comprising a shaft, a contact controlling member rotatable about said shaft and biased for rotation, latching means for holding said member to prevent said rotation, a part rotatable about said shaft for releasing said latching means upon rotation in a given direction, a compensating thermostat connecting said part with said shaft for varying their relative angular position in dependence upon changes in ambient temperature, so as to move said part in opposition to said direction when said temperature increases, another thermostat having one end stationary and the other end linked to said shaft for revolving it when heated in said given direction, and electric means for heating said latter thermostat in response to overload.

10. An overload-responsive electric contactor comprising a shaft, a contact controlling member rotatable about said shaft and biased for rotation, latch means for holding said member to prevent said rotation, a part rotatable about said shaft for releasing said latch means upon rotation in a given direction, a compensating thermostat connecting said part with said shaft for varying their relative angular position in dependence upon changes in ambient temperature so as to rotate said part in opposition to said direction when said temperature increases, a separate shaft coupled with said first shaft for imparting rotary motion thereto, a bimetal winding having one end fixed and the other connected to said separate shaft for rotating it, and electric means for heating said winding in response to overload, in order to cause rotation of said part in said direction.

11. An overload-responsive electric contactor comprising a shaft, a contact controlling member rotatable about said shaft and biased for rotation, latching means for holding said member to prevent said rotation, a part rotatable about said shaft for releasing said latching means upon rotation in a given direction, a compensating thermostat connecting said part with said shaft for varying their relative angular position in dependence upon changes in ambient temperature so as to rotate said part in opposition to said direction when said temperature increases, a plurality of separate shafts each extending at an angle to said first shaft and having means for imparting rotation thereto, a plurality of bimetal windings each having one end stationary and the other connected to one of said separate shafts respectively, a plurality of electric heating means associated with said windings respectively, and means for connecting said heating means with different phases respectively of a multiphase circuit, whereby said part is caused to rotate in said direction upon occurrence of overload in any of the phases of said circuit.

12. An overload-responsive electric contactor comprising a shaft, a contact controlling member rotatable about said shaft and biased for rotation, latching means for holding said member to prevent said rotation, a part rotatable about said shaft for releasing said latching means upon rotation in a given direction, a compensating thermostat connecting said part with said shaft for varying their relative angular position in dependence upon changes in ambient temperature so as to rotate said part in opposition to said direction when said temperature increases, a plurality of separately revolvable mechanisms, unidirectional transmission means disposed between said shaft and each of said mechanisms for imparting rotation to said shaft in said given direction, a plurality of thermostatic means for controlling said respective mechanisms, and multiphase electric circuit means for controlling said thermostatic means respectively in response to overload, whereby said part is caused to rotate in said direction upon occurrence of overload in any phase of said circuit means.

13. An electric contact apparatus comprising, in combination, a contact controlling member biased for motion in a given direction, latching means for preventing said motion, releasing means for controlling said latching means, a shaft for actuating said releasing means, and a plurality of mechanisms for revolving said shaft, each of said mechanisms having another shaft extending substantially at a right angle to said first shaft and electrically heated thermostat means for revolving said other shaft, means for connecting a multiphase circuit to said thermostat means for controlling the latter in response to the current in the different circuit phases respectively, and a corresponding plurality of mechanical transmission means disposed between said first shaft and each of said other shafts respectively.

14. An electric contact apparatus comprising, in combination, a base structure, a spring biased contact-controlling member movably mounted on said structure, means for latching said member against motion under its bias, means for releasing said latching means, a shaft revolvably secured to said structure for controlling said releasing means, and a mechanism for actuating said shaft in response to rated electric current, said mechanism forming a unit detachable from said structure and having an insulating support mounted on said structure and a shaft revolvably mounted on said support, transmission means for linking said mechanism shaft with said first shaft to impart rotation to the latter, a helical bimetal winding connected between said support and said mechanism shaft so as to revolve the latter in response to changes in temperature, and an electric heater calibrated for said rated current and exchangeably mounted on said support in proximity to said winding.

15. An electric contact apparatus comprising a base structure, a spring biased contact-controlling member movably mounted on said structure, means for latching said member against motion under its bias, means for releasing said latching means, a shaft revolvably secured to said structure for controlling said releasing means, and a plurality of mechanisms for actuating said shaft in response to rated electric current, each of said mechanisms forming a self-contained unit attached to said structure and comprising in combination an insulating support, a shaft journalled in said support, unidirectional coupling means for transmitting releasing motion from said mechanism shaft to said first shaft, a helical bimetal winding connected between said support and said mechanism shaft so as to revolve the latter in response to changes in temperature, and an electric heater rated for said current and exchangeably mounted on said support in proximity to said winding.

16. In a switch having a manually operable contact closing mechanism and overload-responsive means for tripping said mechanism, said means comprising a movable tripping member biased for motion toward tripping position, a rotatable catch member for normally holding said tripping member against its bias, a spring for biasing said catch member for rotation in the releasing direction, clutch means for holding said catch member in catching position against the bias of said spring, a thermostatically controlled rotatable member for releasing said clutch in response to overload, said catch member and release member having a common shaft and being statically and dynamically balanced relative to said shaft so as to be prevented from uncontrolled operation due to shock.

17. In a switch comprising a manually operable toggle joint mechanism having a cradle for tripping the mechanism, said cradle being pivoted for angular tripping motion and biased toward tripping position, a rotatable catch member for engaging said cradle so as to prevent it from moving under its bias, a spring for biasing said catch member for rotation in the releasing direction, clutch means for holding said catch member in catching position against the bias of said spring, a thermostatically controlled rotatable member for releasing said clutch in response to overload, said catch member and release member having a common shaft and being statically and dynamically balanced relative to said shaft so as to be prevented from uncontrolled operation due to shock.

18. In a switch comprising a manually operable toggle joint mechanism having a cradle for tripping the mechanism, said cradle being pivoted at one end for angular tripping motion and biased toward tripping position, a rotatable catch member arranged adjacent the other end of said cradle and having a part for engaging said cradle in order to normally latch it against its bias, overload-responsive means for rotating said catch part away from said cradle for releasing the latter, said cradle forming a curved cam surface at the place of engagement with said catch part, and said cam surface being inclined toward the cradle pivot so as to exert on said part a force in the latching direction when affected by shock forces.

19. In a switch comprising a manually operable toggle joint mechanism having a cradle for tripping the mechanism, said cradle being pivoted at one end for angular tripping motion and biased toward tripping position, a rotatable catch member arranged adjacent the other end of said cradle and having a part for engaging said cradle in order to normally latch it against its bias, the pivot axis of said cradle and the axis of rotation of said catch member being substantially in parallel to each other, overload-responsive means for rotating said catch part away from said cradle for releasing the latter, said cradle forming a cam surface at the place of engagement with said catch part, and said cam surface forming substantially a circle about a center spaced from said axis of rotation in a direction opposite to said pivot axis.

20. In a switch comprising a manually operable toggle joint mechanism having a cradle for tripping the mechanism, said cradle being pivoted at one end for angular tripping motion and biased toward tripping position, a rotatable catch member arranged adjacent the other end of said cradle and having a part for engaging said cradle in order to normally retain it against its bias, the pivot axis of said cradle and the axis of rotation of said catch member being substantially in parallel to each other, overload responsive means for causing said catch part to rotate away from said cradle for releasing the latter, said cradle having a curved cam surface at the place of engagement with said catch part, and said cam surface forming substantially a circle about a center spaced from said axis of rotation at the side opposite to said pivot axis, and said catch member being substantially balanced about said axis of rotation in static and dynamic respect.

21. An electric contact apparatus comprising a support, a contact-controlling member journalled in said support and biased for rotation in a given direction, an adjusting member rotatably seated in said support, a helical clutching spring having one end linked to said adjusting member and engaging said contact-controlling member for normally preventing its rotation in said direction while permitting rotation in the opposite direction, clutch control means for engaging the other end of said spring so as to unwind said spring for releasing said contact-controlling member, and load-responsive electric means for actuating said control means upon occurrence of load conditions according to the rotary position of said adjusting member.

22. An electric contact apparatus comprising a support, a contact-controlling member journalled in said support and biased for rotation in a given direction, an adjusting member rotatably seated in said support, a helical clutching spring having one end linked to said adjusting member and engaging said contact-controlling member for normally preventing its rotation in said direction while permitting rotation in the opposite direction, clutch control means for engaging the other end of said spring so as to unwind said spring for releasing said contact-controlling member, a shaft and a compensating bimetal winding connecting said shaft with said clutch control means so as to vary their relative angular position in accordance with changes in ambient temperature, and a load responsive mechanism coupled with said shaft for actuating it upon occurrence of load conditions depending on the angular adjustment of said adjusting member.

LAWRENCE PIERCE.